United States Patent
Tanaka

(10) Patent No.: US 10,479,144 B2
(45) Date of Patent: Nov. 19, 2019

(54) PNEUMATIC TIRE

(71) Applicant: SUMITOMO RUBBER INDUSTRIES, LTD., Kobe-shi, Hyogo (JP)

(72) Inventor: Kaori Tanaka, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 426 days.

(21) Appl. No.: 15/496,870

(22) Filed: Apr. 25, 2017

(65) Prior Publication Data

US 2017/0305205 A1 Oct. 26, 2017

(30) Foreign Application Priority Data

Apr. 26, 2016 (JP) .................. 2016-087759

(51) Int. Cl.
*B60C 15/04* (2006.01)
*B60C 15/02* (2006.01)

(52) U.S. Cl.
CPC .......... *B60C 15/023* (2013.01); *B60C 15/022* (2013.01); *B60C 15/04* (2013.01); *B60C 2015/044* (2013.01)

(58) Field of Classification Search
CPC .... B60C 15/00; B60C 15/04; B60C 2015/044
See application file for complete search history.

(56) References Cited

U.S. PATENT DOCUMENTS 6,273,162 B1 8/2001 Ohara et al.

FOREIGN PATENT DOCUMENTS

JP 62121039 * 6/1987

* cited by examiner

*Primary Examiner* — Justin R Fischer
(74) *Attorney, Agent, or Firm* — Birch, Stewart, Kolasch & Birch, LLP

(57) ABSTRACT

A tire 2 includes a pair of beads 12 and a carcass 14. A core 28 of each bead 12 includes a body 34 having a hexagonal cross-section, and a cover 36 covering the body 34. The cover 36 is wrapped around the body 34, and the number of turns the cover 36 is wrapped around the body 34 is greater than or equal to one and smaller than two. The cover 36 includes a plain weave fabric obtained by interlacing warp threads 72 and weft threads 74. The warp threads 72 and the weft threads 74 intersect. An angle of the intersection is greater than or equal to 45° and not greater than 125°. The warp threads 72 are inclined relative to a carcass cord 70. An angle of the inclination is greater than or equal to 22.5° and not greater than 67.5°.

7 Claims, 5 Drawing Sheets

PNEUMATIC TIRE

This application claims priority on Patent Application No. 2016-087759 filed in JAPAN on Apr. 26, 2016. The entire contents of this Japanese Patent Application are hereby incorporated by reference.

BACKGROUND OF THE INVENTION

Field of the Invention

The present invention relates to pneumatic tires. More particularly, the present invention relates to heavy duty pneumatic tires which are mounted onto trucks, buses, and the like.

Description of the Related Art

Each bead portion of a tire is fitted onto a rim. Each tire bead includes a ring-shaped core. The core includes a wound non-stretchable wire. The wire is arranged so that the core has a suitable cross-sectional shape. For many heavy duty tires which are mounted onto trucks (including Light trucks), buses, and the like, a core having a hexagonal cross-sectional shape is employed, from the viewpoint of ensuring sufficient fitting force. In this case, the core is formed so that a longest diagonal line of the hexagonal cross-sectional shape is generally parallel to a rim seat.

A tire includes a carcass. The carcass includes a carcass ply. The carcass ply is typically turned up around each core from the inner side toward the outer side in the axial direction.

The carcass ply includes multiple carcass cords aligned with each other. The carcass cords are covered with a topping rubber.

When a carcass having a radial structure is employed, the carcass cords extend substantially in the radial direction at each side of the tire. The carcass ply is extended on and between one bead and the other bead. Tension acts on the carcass cords.

When a heavy load acts on a tire, high tension acts on the carcass cords. When the above core having a hexagonal cross-sectional shape is employed in each bead, the carcass cord comes into contact with the core at the ends of a longest diagonal line, that is, a vertex portion of the core corresponding to the axially inner end of that diagonal line, and another vertex portion disposed radially inward of that vertex portion, and therefore may be broken. Damage involving breakage of the carcass cord is referred to as "casing break up (CBU)".

Various studies have been made in order to prevent occurrence of CBU and improve durability. Among these studies is, for example, one disclosed in JP11-291724 (U.S. Pat. No. 6,273,162B1).

In order to prevent occurrence of CBU, the core of the bead may be covered with a cord fabric. However, open spaces between the threads in the cord fabric are larger than open spaces between the threads in a woven fabric. The cord fabric cannot sufficiently inhibit movement of the rubber present between the carcass cords and the core. Therefore, when excessive tension acts on the carcass cords, the rubber may flow, so that the rubber which should be present between the carcass cords and the core may be dislodged therefrom. When the rubber is dislodged, the carcass cords come into contact with the fabric or the core, and therefore, CBU occurs. The cord fabric has a problem that occurrence of CBU cannot be sufficiently prevented.

The tire disclosed in the above publication includes a fabric which is wrapped two turns around the core. The wrapped fabric makes each vertex portion of the core into the shape of an arc, that is, smooth, and therefore, the bending and contact pressure of the carcass cords are reduced. However, wrapping the fabric two turns around the core influences the productivity. In addition, when a fabric of fine texture such as a woven fabric is employed, the fabric has high stiffness, and it is may be difficult to wrap the fabric around the core.

Thus, there is room for improvement in the technique of preventing occurrence of CBU and thereby increasing durability, without an impairment of productivity.

It is an object of the present invention to provide a pneumatic tire in which an improvement in durability is achieved without an impairment of productivity.

SUMMARY OF THE INVENTION

A pneumatic tire according to the present invention includes a tread, a pair of sidewalls, a pair of beads, and a carcass. The sidewalls extend almost inward from ends, respectively, of the tread in a radial direction. The beads are disposed inward of the sidewalls, respectively, in the radial direction. The carcass is extended on and between one of the beads and the other of the beads along inner sides of the tread and the sidewalls. The carcass includes a carcass ply. The carcass ply includes a carcass cord. Each bead includes a core extending in a circumferential direction. The core includes a body having a hexagonal cross-section, and a cover covering the body. The cover is wrapped around the body, the number of turns the cover is wrapped around the body being greater than or equal to one and smaller than two. The cover includes a plain weave fabric obtained by interlacing warp threads and weft threads. The warp threads and the weft threads intersect, and an angle of the intersection is greater than or equal to 45° and not greater than 125°. The warp threads are inclined relative to the carcass cord, and an angle of the inclination is greater than or equal to 22.5° and not greater than 67.5°.

Preferably, in the pneumatic tire, in the plain weave fabric, a large number of the warp threads spaced at intervals and a large number the weft threads are spaced at intervals. Each interval of the warp threads is greater than or equal to 0.5 mm and not greater than 2.0 mm. Each interval of the weft threads is greater than or equal to 0.5 mm and not greater than 2.0 mm.

Preferably, in the pneumatic tire, the warp threads each have a strength of greater than or equal to 20 N. The weft threads each have a strength of greater than or equal to 20 N.

Preferably, in the pneumatic tire, the cover has a thickness of greater than or equal to 0.6 mm and not greater than 1.2 mm.

Preferably, in the pneumatic tire, in the core, one end portion of the cover and another end portion of the cover overlap, and the overlap has a length of greater than or equal to 3 mm and not greater than 15 mm.

Preferably, in the pneumatic tire, the warp threads each have a fineness of greater than or equal to 300 dtex and not greater than 1670 dtex. The weft threads each have a fineness of greater than or equal to 300 dtex and not greater than 1670 dtex.

Preferably, the pneumatic tire further includes a belt disposed inward of the tread in the radial direction. The belt has an axial width which is greater than or equal to 0.7 times a cross-sectional width of the tire.

DESCRIPTION OF THE PREFERRED EMBODIMENTS

The following will describe in detail the present invention based on preferred embodiments with reference to the accompanying drawings.

Figure 1:
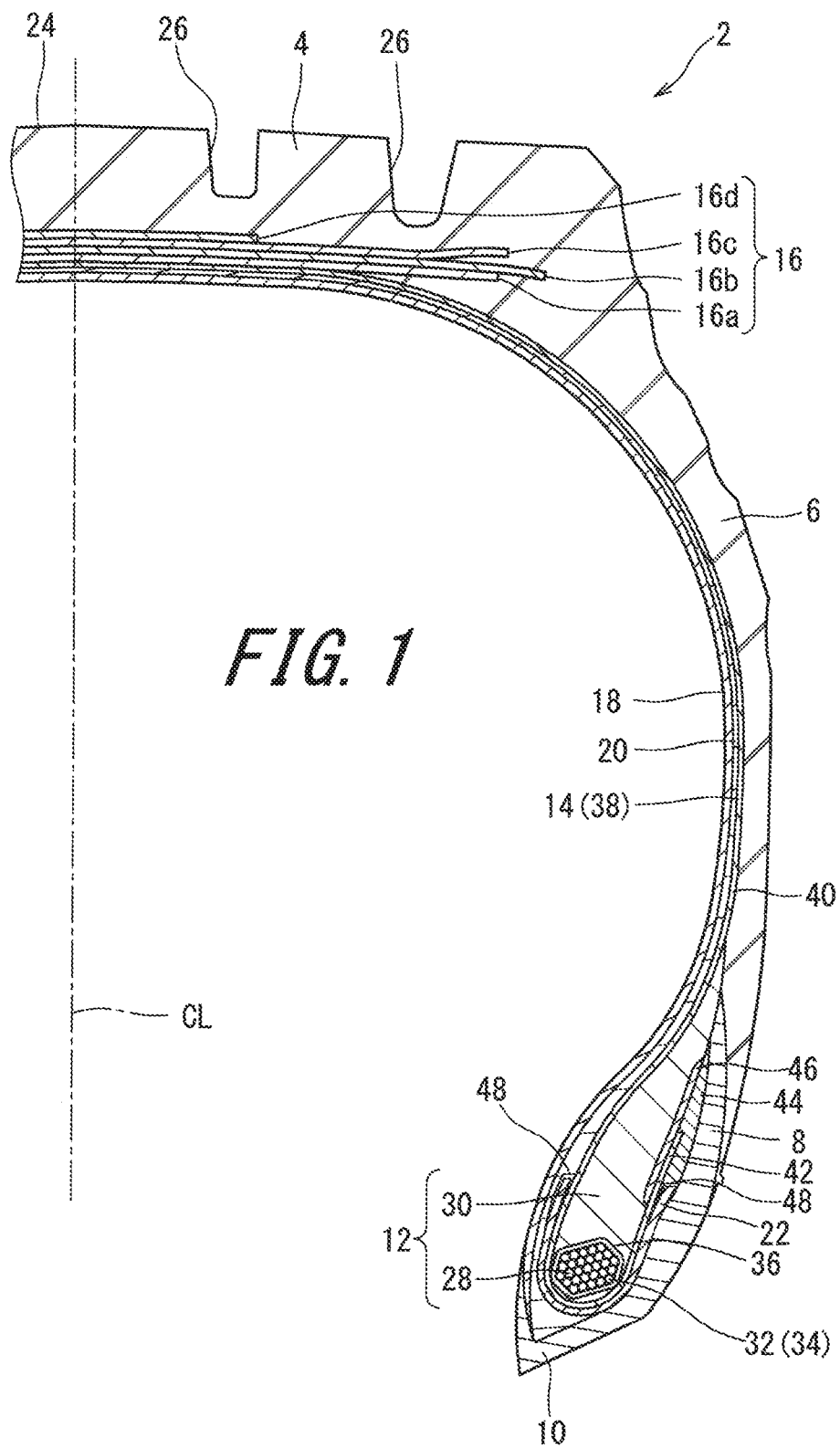
FIG. 1 is a cross-sectional view of a part of a pneumatic tire according to one embodiment of the present invention.

FIG. 1 shows a pneumatic tire 2. Specifically, FIG. 1 shows a part of a cross-section of the tire 2 taken along a plane including the center axis of rotation of the tire 2. In FIG. 1, the up-down direction represents the radial direction of the tire 2, the right-left direction is the axial direction of the tire 2, and the direction perpendicular to the drawing sheet is the circumferential direction of the tire 2. In FIG. 1, an alternate long and short dash line CL represents the equator plane of the tire 2. The shape of the tire 2 is symmetric about the equator plane except for a tread pattern.

The tire 2 includes a tread 4, a pair of sidewalls 6, a pair of clinches 8, a pair of chafers 10, a pair of beads 12, a carcass 14, a belt 16, an inner liner 18, an insulation 20, and a pair of fillers 22. The tire 2 is of a tubeless type. The tire 2 is mounted to a truck (including a light truck), a bus, or the like. The tire 2 is a heavy duty tire.

The tread 4 has a shape which is convex outward in the radial direction. The tread 4 has a tread surface 24 which comes into contact with the road surface. In the tread 4, grooves 26 are formed. A tread pattern is formed by the grooves 26. The tread 4 is made of a crosslinked rubber. For the tread 4, wear resistance, heat resistance, and grip performance are taken into consideration.

Each sidewall 6 extends almost inward from the end of the tread 4 in the radial direction. The sidewall 6 is disposed axially outward of the carcass 14. The sidewall 6 is made of a crosslinked rubber which is excellent in cut resistance and weather resistance. The sidewall 6 prevents damage to the carcass 14.

Each clinch 8 is disposed almost inward of the sidewall 6 in the radial direction. The clinch 8 is disposed axially outward of the bead 12 and the carcass 14. The clinch 8 is made of a crosslinked rubber which is excellent in wear resistance. The clinch 8 comes into contact with a flange of a rim.

Each chafer 10 is disposed in the vicinity of the bead 12. In the tire 2, the chafer 10 extends almost inward from an end of the clinch 8 in the axial direction. The chafer 10 is formed integrally with the clinch 8. The chafer 10 is made of the same material as that of the clinch 8.

Each bead 12 is disposed axially inward of the clinch 8. As described above, the clinch 8 is disposed almost inward of the sidewall 6 in the radial direction. The bead 12 is disposed radially inward of the sidewall 6. The bead 12 includes a core 28 and an apex 30.

The core 28 extends in the circumferential direction. The core 28 is ring-shaped. The core 28 includes a wound non-stretchable wire 32. A typical material for the wire 32 is steel. In the tire 2, the core 28 is formed by a body 34 composed of the wound non-stretchable wire 32 being covered with a cover 36. The core 28 includes the body 34 and the cover 36 which covers the body 34. The cover 36 holds the wound wire 32 included in the body 34.

The apex 30 extends outward from the core 28 in the radial direction. As can be seen from FIG. 1, the apex 30 is tapered outward in the radial direction. The apex 30 is made of a highly hard crosslinked rubber.

The carcass 14 includes a carcass ply 38. In the tire 2, the carcass 14 includes a single carcass ply 38. The carcass 14 may include two or more carcass plies 38.

In the tire 2, the carcass ply 38 is extended on and between the beads 12 on both sides, along inner sides of the tread 4, the sidewalls 6, and the clinches 8. The carcass ply 38 is turned up around each core 28 from the inner side toward the outer side in the axial direction. By the turning-up, a main portion 40 and a pair of turned-up portions 42 are formed in the carcass ply 38. The carcass ply 38 includes the main portion 40 and the pair of turned-up portions 42.

The carcass ply 38 includes multiple carcass cords aligned with each other, and a topping rubber. The absolute value of the angle of each carcass cord relative to the equator plane is greater than or equal to 75°. The absolute value of the angle is preferably greater than or equal to 80°, and preferably not greater than 90°. In other words, the carcass 14 has a radial structure. The carcass cords are made of steel. The carcass ply 38 includes multiple steel cords.

In the tire 2, an end of the turned-up portion 42 is disposed between the outer end of the apex 30 and the core 28 in the radial direction. As described above, the tire 2 is mounted to a truck, a bus, or the like. A heavy load acts on the bead 12 portion of the tire 2. Distortion tends to concentrate on the end of the turned-up portion 42. In the tire 2, the bead 12 portion further includes a middle layer 44 and a strip 46. These elements inhibit concentration of distortion on the end of the turned-up portion 42.

The belt 16 is disposed radially inward of the tread 4. The belt 16 is layered over the carcass 14. The belt 16 reinforces the carcass 14. In the tire 2, the belt 16 includes a first layer 16a, a second layer 16b, a third layer 16c, and a fourth layer 16d. In the tire 2, the belt 16 includes the four layers. The belt 16 may include three layers or two layers.

As can be seen from FIG. 1, in the tire 2, of the first layer 16a, the second layer 16b, the third layer 16c, and the fourth layer 16d included in the belt 16, the second layer 16b is the widest in the axial direction. In the tire 2, the ends of the layer having the largest axial width of the plurality of layers included in the belt 16, that is, the ends of the second layer 16b, are the ends of the belt 16. In the tire 2, the axial width of the belt 16 is represented by the axial width of the second layer 16b. The axial width of the belt 16 is preferably greater than or equal to 0.7 times the cross-sectional width (see JATMA) of the tire 2.

Although not shown, each of the first layer 16a, the second layer 16b, the third layer 16c, and the fourth layer 16d includes multiple cords aligned with each other, and a topping rubber. Each cord is made of steel. The belt 16 includes the steel cords. In each layer, the cords are inclined relative to the equator plane. The absolute value of the angle of each cord relative to the equator plane is 12° to 70°.

The inner liner 18 is disposed inward of the carcass 14. The inner liner 18 is joined to the inner surface of the carcass 14 with the insulation 20 being interposed therebetween. The inner liner 18 is made of a crosslinked rubber which is excellent in airtightness. A typical base rubber of the inner liner 18 is an isobutylene-isoprene-rubber or a halogenated isobutylene-isoprene-rubber. The inner liner 18 maintains the internal pressure of the tire 2.

The insulation 20 is disposed between the carcass 14 and the inner liner 18. The insulation 20 is made of a crosslinked rubber which is excellent in adhesiveness. The insulation 20 is joined firmly to the carcass 14, and is also joined firmly to the inner liner 18. The insulation 20 prevents separation of the inner liner 18 from the carcass 14.

The fillers 22 are disposed near the beads 12, respectively. The fillers 22 are layered over the carcass 14. The fillers 22 are turned up around the cores 28 of the beads 12, respectively, at the radially inner side of the carcass 14. Although not shown, the fillers 22 each include multiple cords aligned with each other, and a topping rubber. Each cord is inclined relative to the radial direction. The cords are made of steel. The fillers 22 inhibit tilting of the bead 12 portions, respectively. The fillers 22 contribute to the durability of the tire 2. In the tire 2, the ends of the fillers 22 are covered with cover rubber 48.

Figure 2:
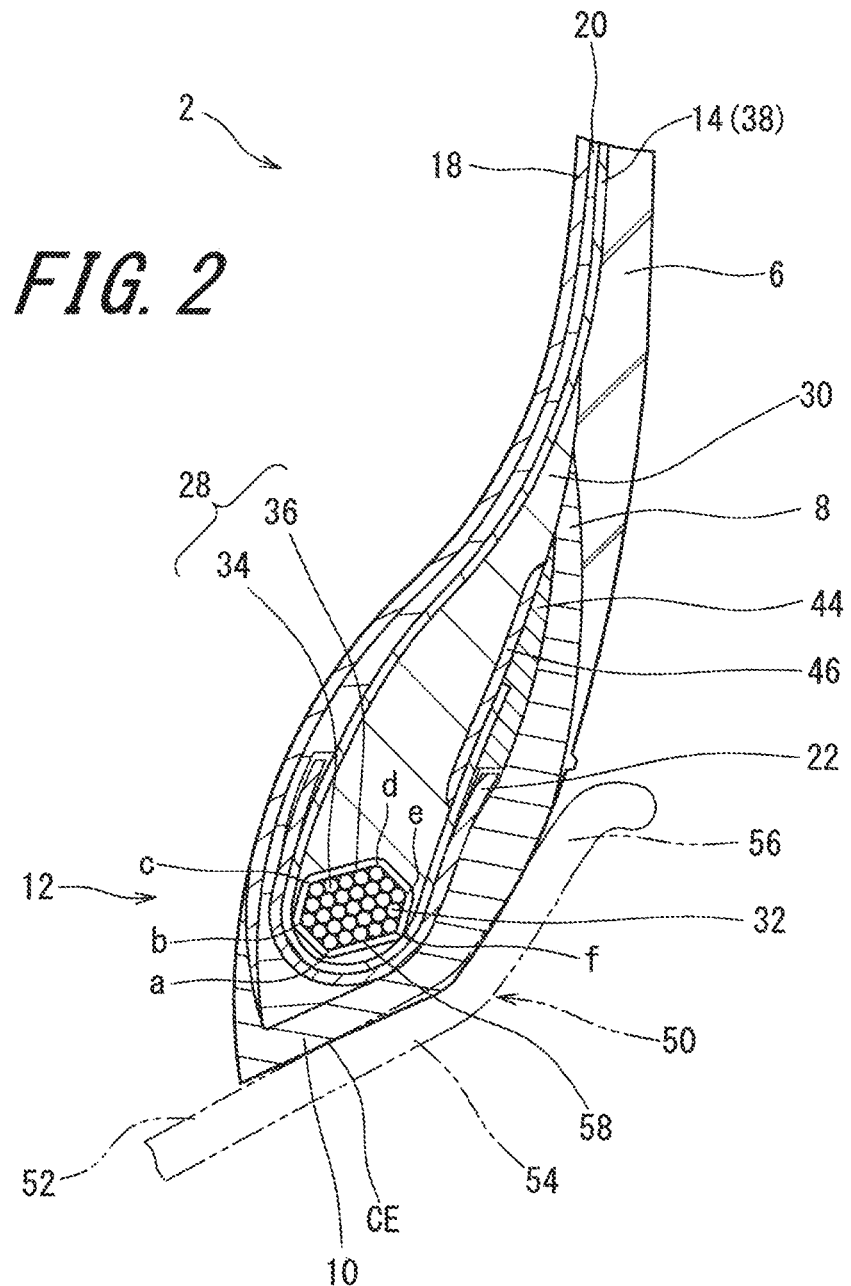
FIG. 2 is an enlarged cross-sectional view of a part of the tire in FIG. 1.

FIG. 2 shows the bead 12 portion of the tire 2 in FIG. 1. In FIG. 2, the up-down direction is the radial direction of the tire 2, the right-left direction is the axial direction of the tire 2, and the direction perpendicular to the drawing sheet is the circumferential direction of the tire 2.

FIG. 2 also shows a rim 50 on which the tire 2 is mounted. The rim 50 is a normal rim. The tire 2 is mounted onto the rim 50, and is inflated with air so that the internal pressure of the tire 2 is a normal internal pressure.

In the description herein, "normal rim" means a rim that is specified by the standard with which the tire 2 complies. A normal rim may be a "standard rim" in the JATMA standards, a "design rim" in the TRA standards, or a "measuring rim" in the ETRTO standards.

In the description herein, "normal internal pressure" means an internal pressure that is specified by the standard with which the tire 2 complies. A normal internal pressure may be a "maximum air pressure" in the JATMA standards, a "maximum value" recited in the "TIRE LOAD LIMITS AT VARIOUS COLD INFLATION PRESSURES" in the TRA standards, or an "inflation pressure" in the ETRTO standards.

In the description herein, "normal load" means a load that is specified by the standard with which the tire 2 complies. A normal load may be a "maximum load capacity" in the JATMA standards, a "maximum value" recited in the "TIRE LOAD LIMITS AT VARIOUS COLD INFLATION PRESSURES" in the TRA standards, and a "load capacity" in the ETRTO standards.

In the present invention, unless otherwise specified, the dimensions and angles of the components of the tire 2 are measured in a state where the tire 2 is mounted on a normal rim and inflated with air to a normal internal pressure. During the measurement, no load is applied to the tire 2.

The rim 50 includes a pair of fit portions 52. The bead 12 portions of the tire 2 are fitted with the fit portions 52, respectively. The fit portions 52 each include a rim seat 54 and a rim flange 56. The chafers 10 of the tire 2 are put on the rim seats 54, respectively. The clinches 8 of the tire 2 are brought into contact with the rim flanges 56, respectively.

In the rim 50 shown in FIG. 2, the rim seat 54 is inclined relative to the axial direction. The inclination angle of the rim seat 54 is typically set within the range of greater than or equal to 5° and not greater than 20°.

In particular, the rim 50 the inclination angle of which is set to 15° is referred to also as a "15°-tapered rim". The inclination angle is represented by the angle of the rim seat 54 relative to an imaginary line (axial direction) perpendicular to a rim center line (not shown).

In the tire 2, the body 34 of the core 28 is formed by arrangement of the wires 32 so that the body 34 has a hexagonal cross-section. The cross-section of the body 34 has six vertex portions. For the sake of convenience in description of the present invention, the vertex portions are indicated by reference characters "a", "b", "c", "d", "e", and "f". In the body 34, the vertex portion "b" is the axially inner end of the body 34.

In the tire 2, in the contour of the cross-section of the body 34, assuming that a straight line connecting opposite vertex portions is a diagonal line, a diagonal line "be" connecting the vertex portion "b" and the vertex portion "e" is the longest of all the diagonal lines in the cross-section. In the present invention, the diagonal line "be" is referred to also as "major axis".

In the tire 2, in the contour of the cross-section of the body 34, assuming that a straight line connecting adjacent vertex portions is a side of the cross-section of the body 34, a side "fa" connecting the vertex portion "f" and the vertex portion "a", and a side "cd" connecting the vertex portion "c" and the vertex portion "d", are the longest of all the sides. In the present invention, the side "fa" and the side "cd" are both referred to also as "major sides".

As can be seen from FIG. 2, in the tire 2, the major axis "be", the major side "fa", and the major side "cd" extend substantially in the axial direction. In the tire 2, the cross-section of the body 34 is in the shape of a flattened hexagon which is elongated in the axial direction.

In the tire 2, the major side "fa" is a bottom side 58 of the cross-section of the core 28. The major side "fa" faces the rim seat 54 of the rim 50. In the tire 2, the contour of the body 34 is shaped so that the major side "fa" is substantially parallel to the rim seat 54 in a state where the tire 2 is mounted on the rim 50. In the present invention, when the difference between the angle of the major side "fa" relative to the axial direction and the inclination angle of the rim seat 54 is not greater than 5°, it is determined that the major side "fa" is substantially parallel to the rim seat 54.

In FIG. 2, reference character CE indicates one end of a contact surface between the tire 2 and the rim 50. As shown in FIG. 2, the tire 2 is not in contact with the rim 50 at a portion inward of the end CE in the axial direction. A gap is formed between the tire 2 and the rim 50 at the portion inward of the end CE in the axial direction.

As shown in FIG. 2, the position of the end CE of the contact surface substantially coincides with the position of the vertex portion "a" of the body 34 in the axial direction. In other words, the end CE of the contact surface is formed at a position corresponding to the vertex portion "a" of the body 34 in the axial direction in a state where the tire 2 is mounted on the rim 50 and inflated with air to a normal internal pressure.

Figure 3:
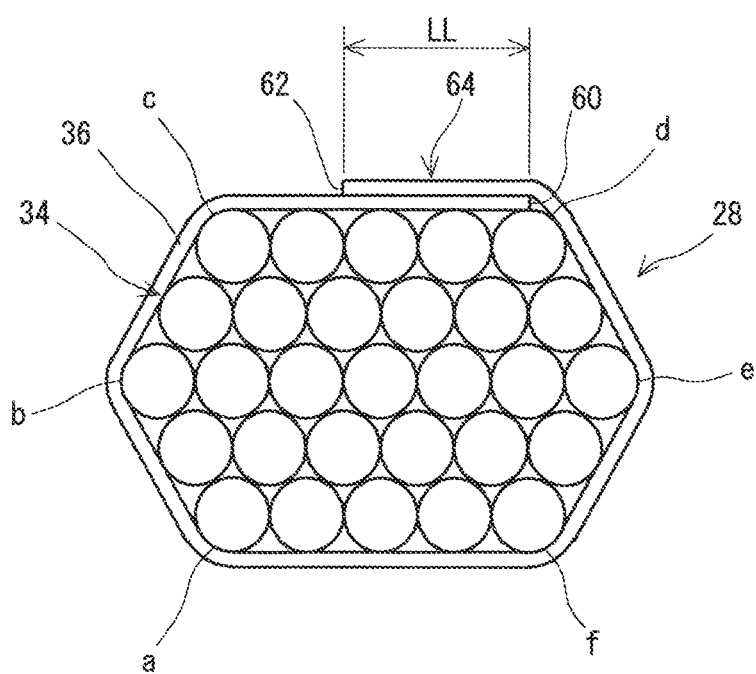
FIG. 3 is a cross-sectional view of a core of a bead of the tire in FIG. 1.

FIG. 3 shows details of the cross-section of the core 28. As described above, the core 28 includes the body 34 and the cover 36 which covers the body 34. In the tire 2, the cover 36 is in the shape of a sheet. As shown in FIG. 3, the cover 36 is wrapped one turn around the body 34. One end 60 portion of the cover 36 overlaps the other end 62 portion thereof. In the tire 2, one end 60 of the cover 36 may be joined to the other end 62 thereof without the one end 60 portion of the cover 36 overlapping the other end 62 portion thereof. As described below, in the tire 2, the cover 36 is not wrapped two or more turns around the body 34. That is, in the tire 2, the number of turns the cover 36 is wrapped around the body 34 is greater than or equal to one and smaller than two.

As shown in FIG. 3, an overlap 64 of the cover 36 is formed between the vertex portion "c" and the vertex portion "d" of the body 34. In the tire 2, the overlap 64 only needs to be formed within the range from the vertex portion "b" to the vertex portion "e" via the vertex portion "c" and the vertex portion "d". The overlap 64 is formed at any position within that range.

In FIG. 3, a double-headed arrow LL indicates the length of the overlap 64 of the cover 36. The length LL is represented by the length from the one end 60 to the other end 62 of the cover 36 in the cross-section of the core 28 shown in FIG. 3.

In the tire 2, from the viewpoint of providing a sufficient joint between the one end 60 portion and the other end 62 portion of the cover 36, the length LL of the overlap 64 is preferably greater than or equal to 3 mm and more preferably greater than or equal to 5 mm. The overlap 64 which is sufficiently large influences the weight of the tire 2. Therefore, from the viewpoint of weight reduction, the length LL is preferably not greater than 15 mm and more preferably not greater than 10 mm.

Figure 4:
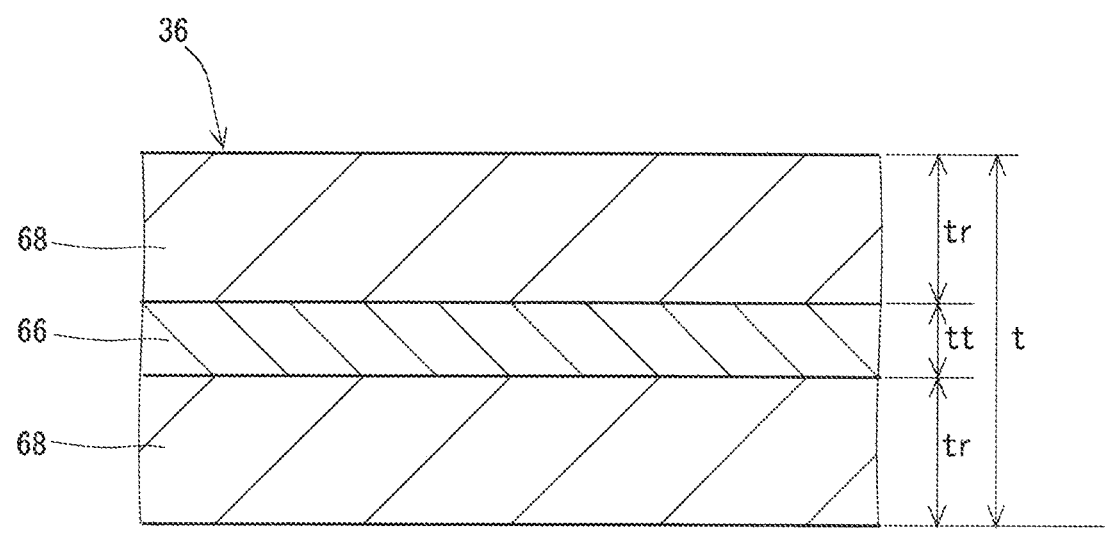
FIG. 4 is a cross-sectional view of a part of a cover covering a body of the core.

FIG. 4 shows a cross-section of the cover 36 taken along the thickness direction thereof. In the tire 2, the cover 36 includes a fabric 66 and a pair of sheets 68. That is, the cover 36 includes the fabric 66. As can be seen from FIG. 4, the fabric 66 is interposed between the two sheets 68.

In the tire 2, each sheet 68 is made of a crosslinked rubber composition. In other words, each sheet 68 is a crosslinked rubber. In the tire 2, the rubber composition for the sheet 68 is not particularly limited. For the sheet 68, a rubber composition having the same composition as that of the topping rubber for the carcass ply 38, the belt 16, or the fillers 22, may be used.

Figure 5:
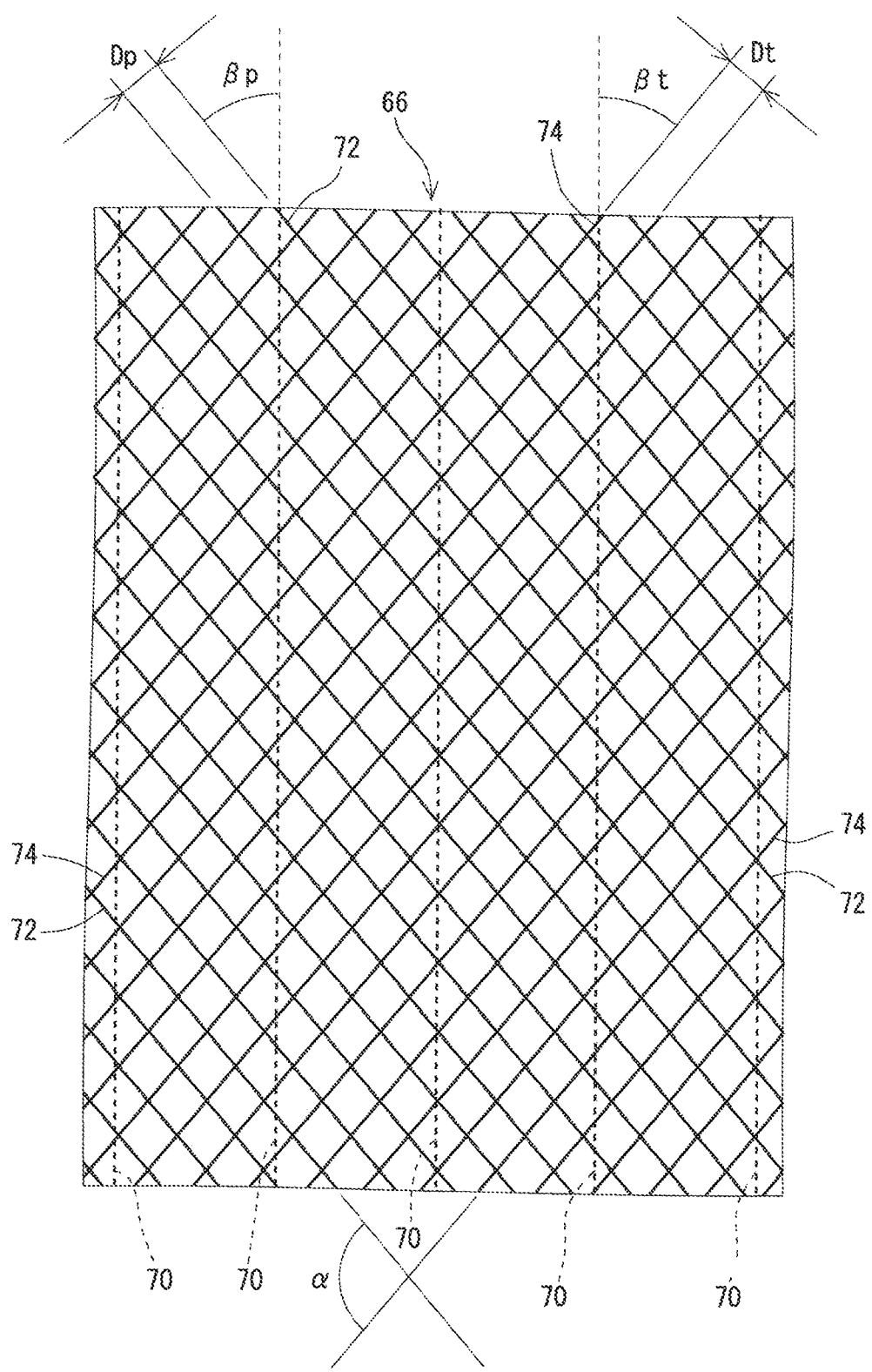
FIG. 5 is a schematic diagram of an arrangement of warp threads and weft threads in a plain weave fabric included in the cover.

FIG. 5 schematically shows the fabric 66 as a component of the cover 36. As shown in FIG. 2, the carcass ply 38 is disposed outward of the cover 36. In FIG. 5, carcass cords 70 included in the carcass ply 38 disposed outward of the cover 36 are indicated by broken lines.

In FIG. 5, thick solid lines represent warp threads 72 and weft threads 74 included in the fabric 66 of the cover 36. Specifically, in the tire 2, the fabric 66 of the cover 36 includes multiple warp threads 72 aligned with each other, and multiple weft threads 74 aligned with each other. The fabric 66 is woven by crossing the warp threads 72 and the weft threads 74 alternately under and over each other. The fabric 66 is a plain weave fabric. The cover 36 includes a plain weave fabric in which the warp threads 72 and the weft threads 74 are interlaced together.

In the tire 2, the warp threads 72 and the weft threads 74 are each made of an organic fiber. Preferable examples of the organic fiber include polyester fibers, nylon fibers, rayon fibers, polyethylene naphthalate fibers, and aramid fibers. In the tire 2, the fabric 66 of the cover 36 is formed using the warp threads 72 and the weft threads 74 which are made of the same material. The fabric 66 may be formed using the warp threads 72 and the weft threads 74 which are made of different materials.

In the tire 2, at least the cover 36 of the core 28 is present between the body 34 of the core 28 and the carcass ply 38. At least the sheet 68 of the cover 36 and the topping rubber of the carcass ply 38 are present between the fabric 66 of the cover 36 and the carcass cords 70. That is, the rubber is present between the fabric 66 and the carcass cords 70. The rubber is more flexible than the fabric 66 and the carcass cords 70.

When a load acts on the tire 2, tension acts on the carcass cords 70 included in the main portion 40 of the carcass ply 38 in a direction in which the carcass cords 70 are stretched outward in the radial direction. This action applies force on the carcass cords 70 so that the carcass cords 70 are pressed against the fabric 66. If the rubber between the carcass cords 70 and the fabric 66 flows due to the application of force to the carcass cords 70 so that the rubber is dislodged, the carcass cords 70 are moved closer to the vertex portions "b" and "a" of the body 34 of the core 28, and in some cases, the carcass cords 70 may be broken.

In FIG. 5, an angle α is the angle of the warp thread 72 relative to the weft thread 74. The angle α is also the angle of the weft thread 74 relative to the warp thread 72. The angle α is an angle at which the warp thread 72 and the weft thread 74 intersect each other. The angle α influences flow of the rubber present between the carcass cords 70 and the core 28. Specifically, if the warp threads 72 and the weft threads 74 are arranged approximately in parallel, a holding force exerted by the warp threads 72 on the weft threads 74, or a holding force exerted by the weft threads 74 on the warp threads 72, decreases, and therefore, the rubber may pass through the fabric 66.

In the tire 2, the intersection angle α is set so that the warp threads 72 and the weft threads 74 are not arranged approximately in parallel. Specifically, the angle α is greater than or equal to 45° and not greater than 125°.

In the tire 2, the intersection angle α is set to be greater than or equal to 45°, and therefore, even when excessive tension acts on the carcass cords 70, the plain weave fabric which is the fabric 66 inhibits flow of the rubber present between the carcass cords 70 and the core 28. Since the rubber is not dislodged and still remains between the carcass cords 70 and the core 28, the carcass cords 70 are prevented from coming into contact with the plain weave fabric or the body 34. The plain weave fabric prevents occurrence of damage such as breakage of the carcass cords 70. From this viewpoint, the angle α is preferably greater than or equal to 60° and more preferably greater than or equal to 90°. In the tire 2, when the intersection angle α is set to be not greater than 125°, the plain weave fabric also exhibits the above effect. Specifically, even when excessive tension acts on the carcass cords 70, the plain weave fabric which is the fabric 66 inhibits flow of the rubber present between the carcass cords 70 and the core 28. Since the rubber is not dislodged and still remains between the carcass cords 70 and the core 28, the carcass cords 70 are prevented from coming into contact with the plain weave fabric or the body 34. The plain weave fabric prevents occurrence of damage such as breakage of the carcass cords 70. From this viewpoint, the angle α is more preferably not greater than 110°.

In the tire 2, the warp threads 72 are inclined relative to the carcass cords 70. In FIG. 5, an angle βp is the angle of the warp thread 72 relative to the carcass cord 70. The angle βp is the inclination angle of the warp thread 72 relative to the carcass cord 70.

If the warp threads 72 and the carcass cords 70 are arranged approximately in parallel, then when great tension acts on the carcass cords 70, the carcass cords 70 push the warp threads 72 toward the body 34, so that the rubber may pass through the fabric 66. Therefore, in the tire 2, the inclination angle βp is set so that the warp threads 72 and the carcass cords 70 are not arranged approximately in parallel. Specifically, the angle βp is greater than or equal to 22.5° and not greater than 67.5°.

In the tire 2, the inclination angle βp is set to be greater than or equal to 22.5°, and therefore, even when excessive tension acts on the carcass cords 70, flow of the rubber present between the carcass cords 70 and the core 28 is effectively inhibited. Since the rubber is not dislodged and still remains between the carcass cords 70 and the core 28, the carcass cords 70 are prevented from coming into contact with the plain weave fabric or the body 34. As a result, occurrence of damage such as breakage of the carcass cords 70 is prevented. From this viewpoint, the angle βp is preferably greater than or equal to 30°. In the tire 2, the same effect is exhibited also when the inclination angle βp is set to be not greater than 67.5°. Specifically, even when excessive tension acts on the carcass cords 70, flow of the rubber present between the carcass cords 70 and the core 28 is effectively inhibited. Since the rubber is not dislodged and still remains between the carcass cords 70 and the core 28, the carcass cords 70 are prevented from coming into contact with the plain weave fabric or the body 34. As a result, occurrence of damage such as breakage of the carcass cords 70 is prevented. From this viewpoint, the angle βp is preferably not greater than 50°.

In the tire 2, the weft threads 74 are inclined relative to the carcass cords 70. In FIG. 5, the angle βt is the angle of the weft thread 74 relative to the carcass cord 70. The angle βt is the inclination angle of the weft thread 74 relative to the carcass cord 70.

If the weft threads 74 and the carcass cords 70 are arranged approximately in parallel, then when great tension acts on the carcass cords 70, the carcass cords 70 push the weft threads 74 toward the body 34, so that the rubber may pass through the fabric 66. Therefore, in the tire 2, the inclination angle βt is set so that the weft threads 74 and the carcass cords 70 are not arranged approximately in parallel. Specifically, the angle βt is greater than or equal to 22.5° and not greater than 67.5°.

In the tire 2, the inclination angle βt is set to be greater than or equal to 22.5°, and therefore, even when excessive tension acts on the carcass cords 70, flow of the rubber present between the carcass cords 70 and the core 28 is effectively inhibited. Since the rubber is not dislodged and still remains between the carcass cords 70 and the core 28, the carcass cords 70 are prevented from coming into contact with the plain weave fabric or the body 34. As a result, occurrence of damage such as breakage of the carcass cords 70 is prevented. From this viewpoint, the angle βp is preferably greater than or equal to 30°. In the tire 2, the same effect is exhibited also when the inclination angle βt is set to be not greater than 67.5°. Specifically, even when excessive tension acts on the carcass cords 70, flow of the rubber present between the carcass cords 70 and the core 28 is effectively inhibited. Since the rubber is not dislodged and still remains between the carcass cords 70 and the core 28, the carcass cords 70 are prevented from coming into contact with the plain weave fabric or the body 34. As a result, occurrence of damage such as breakage of the carcass cords 70 is prevented. From this viewpoint, the angle βt is preferably not greater than 50°.

As described above, in the tire 2, the core 28 of the bead 12 includes the body 34 and the cover 36. The cover 36 includes the plain weave fabric. The intersection angle between the warp threads 72 and the weft threads 74 of the plain weave fabric is greater than or equal to 45° and not greater than 125°. Furthermore, the warp threads 72 are inclined relative to the carcass cords 70. The inclination angle βp is greater than or equal to 22.5° and not greater than 67.5°. The weft threads 74 are also inclined relative to the carcass cords 70. The inclination angle βt is greater than or equal to 22.5° and not greater than 67.5°. In the tire 2, the plain weave fabric in which the warp threads 72 and the weft threads 74 sufficiently hold each other is used. In addition, the plain weave fabric is arranged so that neither the warp threads 72 nor the weft threads 74 are parallel to the carcass cords 70. In the tire 2, a synergistic effect of these features allows the plain weave fabric to sufficiently inhibit flow of the rubber present between the carcass cords 70 and the core 28 even when excessive tension acts on the carcass cords 70. Since the rubber is not dislodged and still remains between the carcass cords 70 and the core 28, the carcass cords 70 are sufficiently prevented from coming into contact with the plain weave fabric or the body 34. In the tire 2, damage such as breakage of the carcass cords 70 is less likely to occur. In the tire 2, an improvement in durability is achieved.

As described above, in the tire 2, the body 34 has a flattened hexagonal cross-section which is elongated in the axial direction. Therefore, in the contour of the cross-section, the vertex portion "b" portion is slightly sharper than the vertex portion "a" portion. In particular, if the carcass cords 70 come into contact with the vertex portion "b" portion, breakage of the carcass cords 70 may be induced. However, as described above, in the tire 2, the plain weave fabric inhibits flow of the rubber present between the carcass cords 70 and the core 28, and therefore, the carcass cords 70 are prevented from coming into contact with the plain weave fabric or the body 34. Accordingly, in the tire 2, unlike conventional tires, it is not necessary to wrap the cover 36 as many as two turns around the core 28 in order to make the vertex portion smooth and thereby prevent breakage of the carcass cords 70. In the tire 2, the influence of wrapping of the cover 36 on the productivity is reduced.

As can be seen from the foregoing description, in the tire 2, an improvement in durability is achieved without an impairment of productivity. In other words, according to the present invention, the pneumatic tire 2 in which an improvement in durability is achieved without an impairment of productivity is obtained.

In FIG. 5, a double-headed arrow Dp indicates the interval between one warp thread 72 and another warp thread 72 adjacent to that warp thread 72. A double-headed arrow Dt indicates the interval between one weft thread 74 and another weft thread 74 adjacent to that weft thread 74. In the tire 2, in the plain weave fabric which is the fabric 66 of the cover 36, the multiple warp threads 72 are spaced at intervals Dp. The multiple weft threads 74 are spaced at intervals Dt.

In the tire 2, the interval Dp of the warp threads 72 is preferably greater than or equal to 0.5 mm and preferably not greater than 2.0 mm. If the interval Dp is set to be greater than or equal to 0.5 mm, the stiffness of the plain weave fabric which is the fabric 66 is suitably maintained without being excessive. In the tire 2, the cover 36 which includes the fabric 66 is easily wrapped around the body 34. For the tire 2, favorable productivity is maintained. From this viewpoint, the interval Dp is more preferably greater than or equal to 0.7 mm. If the interval Dp is set to be not greater than 2.0 mm, open spaces between the threads in the plain weave fabric are suitably maintained, and therefore, the plain weave fabric can effectively inhibit flow of the rubber present between the carcass cords 70 and the core 28. In the tire 2, the carcass cords 70 are sufficiently prevented from coming into contact with the plain weave fabric or the body 34, and therefore, damage such as breakage of the carcass cords 70 is less likely to occur. The tire 2 is excellent in durability. From this viewpoint, the interval Dp is more preferably not greater than 1.3 mm.

In the tire 2, the interval Dt of the weft threads 74 is preferably greater than or equal to 0.5 mm and preferably not greater than 2.0 mm. If the interval Dt is set to be greater than or equal to 0.5 mm, the stiffness of the plain weave fabric which is the fabric 66 is suitably maintained without being excessive. In the tire 2, the cover 36 which includes the fabric 66 is easily wrapped around the body 34. For the tire 2, favorable productivity is maintained. From this viewpoint, the interval Dt is more preferably greater than or equal to 0.7 mm. If the interval Dt is set to be not greater than 2.0 mm, open spaces between the threads in the plain weave fabric are suitably maintained, and therefore, the plain weave fabric can effectively inhibit flow of the rubber present between the carcass cords 70 and the core 28. In the tire 2, the carcass cords 70 are sufficiently prevented from coming into contact with the plain weave fabric or the body 34, and therefore, damage such as breakage of the carcass cords 70 is less likely to occur. The tire 2 is excellent in durability. From this viewpoint, the interval Dt is more preferably not greater than 1.3 mm.

In the tire 2, the warp threads 72 preferably have a strength Fp of greater than or equal to 20 N. If the strength Fp is set to be greater than or equal to 20 N, the warp threads 72 have a suitable stiffness. Even if excessive tension acts on the carcass cords 70 to apply force to the carcass cords 70 so that the carcass cords 70 are pressed against the fabric 66, the warp threads 72 are less likely to be broken. The plain weave fabric effectively inhibits flow of the rubber present between the carcass cords 70 and the core 28, and therefore, in the tire 2, the carcass cords 70 are sufficiently prevented from coming into contact with the plain weave fabric or the body 34. In the tire 2, damage such as breakage of the carcass cords 70 is less likely to occur.

From this viewpoint, the strength Fp is more preferably greater than or equal to 30 N. The strength Fp of the warp threads 72 influences the stiffness of the fabric 66. From the viewpoint of allowing the cover 36 including the fabric 66 to be easily wrapped around the body 34 of the core 28, the strength Fp is preferably not greater than 100 N and more preferably not greater than 75 N.

In the present invention, the strength Fp of the warp threads 72 is measured in compliance with the "tensile strength" in "JIS L1017". The "strength at break" which is measured to obtain the "tensile strength" is the "strength of a thread" in the present invention. Specifically, the strength at break per warp thread 72 is represented as the strength Fp of the warp threads 72. A strength Ft of the weft threads 74 described below is measured in the same manner as for measuring the strength Fp of the warp threads 72.

In the tire 2, the strength Ft of the weft threads 74 is preferably greater than or equal to 20 N. If the strength Ft is set to be greater than or equal to 20 N, the weft threads 74 have a suitable stiffness. Even if excessive tension acts on the carcass cords 70 to apply force to the carcass cords 70 so that the carcass cords 70 are pressed against the fabric 66, the weft threads 74 are less likely to be broken. The plain weave fabric effectively inhibits flow of the rubber present between the carcass cords 70 and the core 28, and therefore, in the tire 2, the carcass cords 70 are sufficiently prevented from coming into contact with the plain weave fabric or the body 34. In the tire 2, damage such as breakage of the carcass cords 70 is less likely to occur. From this viewpoint, the strength Ft is more preferably greater than or equal to 30 N. The strength Ft of the weft threads 74 influences the stiffness of the fabric 66. From the viewpoint of allowing the cover 36 including the fabric 66 to be easily wrapped around the body 34 of the core 28, the strength Ft is preferably not greater than 100 N and more preferably not greater than 75 N.

In the tire 2, the warp threads 72 preferably have a fineness of greater than or equal to 300 dtex. If the fineness is set to be greater than or equal to 300 dtex, the warp threads 72 have a suitable stiffness. Even if excessive tension acts on the carcass cords 70 to apply force to the carcass cords 70 so that the carcass cords 70 are pressed against the fabric 66, the warp threads 72 are less likely to be broken. The plain weave fabric effectively inhibits flow of the rubber present between the carcass cords 70 and the core 28, and therefore, in the tire 2, the carcass cords 70 are sufficiently prevented from coming into contact with the plain weave fabric or the body 34. In the tire 2, damage such as breakage of the carcass cords 70 is less likely to occur. The fineness of the warp threads 72 influences the stiffness of the fabric 66. From the viewpoint of allowing the cover 36 including the fabric 66 to be easily wrapped around the body 34 of the core 28, the fineness is preferably not greater than 1670 dtex.

In the tire 2, the weft threads 74 preferably have a fineness of greater than or equal to 300 dtex. If the fineness is set to be greater than or equal to 300 dtex, the weft threads 74 have a suitable stiffness. Even if excessive tension acts on the carcass cords 70 to apply force to the carcass cords 70 so that the carcass cords 70 are pressed against the fabric 66, the weft threads 74 are less likely to be broken. The plain weave fabric effectively inhibits flow of the rubber present between the carcass cords 70 and the core 28, and therefore, in the tire 2, the carcass cords 70 are sufficiently prevented from coming into contact with the plain weave fabric or the body 34. In the tire 2, damage such as breakage of the carcass cords 70 is less likely to occur. The fineness of the weft threads 74 influences the stiffness of the fabric 66. From the viewpoint of allowing the cover 36 including the fabric 66 to be easily wrapped around the body 34 of the core 28, the fineness is preferably not greater than 1670 dtex.

In FIG. 4, a double-headed arrow "t" indicates the thickness of the cover 36. A double-headed arrow "tt" indicates the thickness of the fabric 66 which is a part of the cover 36. A double-headed arrow "tr" indicates the thickness of each sheet 68 layered over the fabric 66. The thickness "t" of the cover 36 is represented by the sum (tt+2tr) of the thickness "tt" of the fabric 66 and the thicknesses "tr" of the two sheets 68 disposed on the respective sides of the fabric 66.

In the tire 2, the thickness "tt" of the fabric 66 is within the range of 0.1 mm to 0.8 mm. The thickness "tr" of each sheet 68 is within the range of 0.1 mm to 0.5 mm.

In the tire 2, the thickness "t" of the cover 36 including a combination of the fabric 66 and the two sheets 68 is preferably greater than or equal to 0.6 mm and preferably not greater than 1.2 mm. If the thickness "t" is set to be greater than or equal to 0.6 mm, a suitable amount of the rubber present between the carcass cords 70 and the core 28 is ensured, and therefore, the carcass cords 70 are prevented from coming into contact with the plain weave fabric or the body 34. In the tire 2, damage such as breakage of the carcass cords 70 is less likely to occur. The tire 2 is excellent in durability. If the thickness "t" is set to be not greater than 1.2 mm, the stiffness of the cover 36 is suitably maintained. In the tire 2, the cover 36 is easily wrapped around the body 34 of the core 28. For the tire 2, favorable productivity is maintained.

EXAMPLES

The following will show the effects of the present invention by means of examples, but the present invention should not be construed in a limited manner based on the description of these examples.

Example 1

A tire as shown in FIGS. 1 to 5 was produced. The size of the tire was 12.00R20. In Example 1, a plain weave fabric made of a nylon fiber was used as the fabric of the cover. In the plain weave fabric, the warp threads and the weft threads had a fineness of 490 dtex. Specifications of Example 1 are as indicated in Table 1 below.

Examples 2 and 3 and Comparative Examples 1 and 2

Tires of Examples 2 and 3 and Comparative Examples 1 and 2 were obtained in the same manner as for Example 1 except that the intersection angle α between the warp threads and the weft threads, the inclination angle βp of the warp threads relative to the carcass cords, and the inclination angle βt of the weft threads relative to the carcass cords were as indicated in Table 1 below.

Examples 4 and 5 and Comparative Examples 3 and 4

Tires of Examples 4 and 5 and Comparative Examples 3 and 4 were obtained in the same manner as for Example 1 except that the intersection angle α and the inclination angle βp were as indicated in Table 2 below.

Examples 6 and 7 and Comparative Examples 5 and 6

Tires of Examples 6 and 7 and Comparative Examples 5 and 6 were obtained in the same manner as for Example 1 except that the intersection angle α and the inclination angle βt were as indicated in Table 3 below.

Examples 8 to 11

Tires of Examples 8 to 11 were obtained in the same manner as for Example 1 except that the interval Dp of the warp threads and the interval Dt of the weft threads were as indicated in Table 4 below.

Examples 12 and 13

Tires of Examples 12 and 13 were obtained in the same manner as for Example 1 except that the strength Fp of the warp threads and the strength Ft of the weft threads were as indicated in Table 4 below.

Examples 14 to 17

Tires of Examples 14 to 17 were obtained in the same manner as for Example 1 except that the thickness "t" of the cover was as indicated in Table 5 below.

[Durability]

A tire was mounted onto a rim (size=2.0×8.8) and inflated with air to an internal pressure of 1650 kPa. The tire was mounted to a drum type tire testing machine, and a vertical load which was 300% of a normal load was applied to the tire. Running with the tire on a drum having a diameter of 1.7 m at a speed of 20 km/h was performed. After the running was performed for 150 hours, the thickness from the carcass cords to the body of the core in the tire was measured. The results are indicated as indexes in Tables 1 to 5 below. The greater the value of the index is, the more sufficiently the rubber is present between the carcass cords and the core, and the less likely breakage of the carcass cords is to occur, which is more preferable.

[Productivity]

It was verified whether the cover was successfully wrapped around the body to produce the core. The ratio of the number of cores in which the cover was not successfully wrapped around the body to the number of all cores produced was calculated (the ratio is referred to also as "percent defective"). The results are indicated as indexes in Tables 1 to 5 below. The closer the index is to 100, the smaller the percent defective is. The smaller percent defective is more preferable.

TABLE 1

| | Evaluation result | | | | |
|---|---|---|---|---|---|
| | Comp. Ex. 1 | Ex. 2 | Ex. 1 | Ex. 3 | Comp. Ex. 2 |
| α [°] | 30 | 90 | 100 | 110 | 140 |
| βp [°] | 75 | 45 | 40 | 35 | 20 |
| βt [°] | 75 | 45 | 40 | 35 | 20 |
| Dp [mm] | 0.9 | 0.9 | 0.9 | 0.9 | 0.9 |
| Dt [mm] | 0.9 | 0.9 | 0.9 | 0.9 | 0.9 |
| Fp [N] | 34 | 34 | 34 | 34 | 34 |
| Ft [N] | 34 | 34 | 34 | 34 | 34 |
| t [mm] | 0.8 | 0.8 | 0.8 | 0.8 | 0.8 |
| Durability | 100 | 120 | 140 | 120 | 100 |
| Productivity | 100 | 100 | 100 | 100 | 100 |

TABLE 2

| | Evaluation result | | | |
|---|---|---|---|---|
| | Comp. Ex. 3 | Ex. 4 | Ex. 5 | Comp. Ex. 4 |
| α [°] | 125 | 110 | 90 | 60 |
| βp [°] | 15 | 30 | 50 | 80 |
| βt [°] | 40 | 40 | 40 | 40 |
| Dp [mm] | 0.9 | 0.9 | 0.9 | 0.9 |
| Dt [mm] | 0.9 | 0.9 | 0.9 | 0.9 |
| Fp [N] | 34 | 34 | 34 | 34 |
| Ft [N] | 34 | 34 | 34 | 34 |
| t [mm] | 0.8 | 0.8 | 0.8 | 0.8 |
| Durability | 100 | 120 | 120 | 100 |
| Productivity | 100 | 100 | 100 | 100 |

TABLE 3

| | Evaluation result | | | |
|---|---|---|---|---|
| | Comp. Ex. 5 | Ex. 6 | Ex. 7 | Comp. Ex. 6 |
| α [°] | 125 | 110 | 90 | 60 |
| βp [°] | 40 | 40 | 40 | 40 |
| βt [°] | 15 | 30 | 50 | 80 |
| Dp [mm] | 0.9 | 0.9 | 0.9 | 0.9 |
| Dt [mm] | 0.9 | 0.9 | 0.9 | 0.9 |
| Fp [N] | 34 | 34 | 34 | 34 |
| Ft [N] | 34 | 34 | 34 | 34 |

TABLE 3-continued

| | Evaluation result | | | |
|---|---|---|---|---|
| | Comp. Ex. 5 | Ex. 6 | Ex. 7 | Comp. Ex. 6 |
| t [mm] | 0.8 | 0.8 | 0.8 | 0.8 |
| Durability | 100 | 120 | 120 | 100 |
| Productivity | 100 | 100 | 100 | 100 |

TABLE 4

| | Evaluation result | | | | | |
|---|---|---|---|---|---|---|
| | Ex. 8 | Ex. 9 | Ex. 10 | Ex. 11 | Ex. 12 | Ex. 13 |
| α [°] | 100 | 100 | 100 | 100 | 100 | 100 |
| βp [°] | 40 | 40 | 40 | 40 | 40 | 40 |
| βt [°] | 40 | 40 | 40 | 40 | 40 | 40 |
| Dp [mm] | 0.3 | 0.7 | 1.3 | 3.0 | 0.9 | 0.9 |
| Dt [mm] | 0.3 | 0.7 | 1.3 | 3.0 | 0.9 | 0.9 |
| Fp [N] | 34 | 34 | 34 | 34 | 15 | 30 |
| Ft [N] | 34 | 34 | 34 | 34 | 15 | 30 |
| t [mm] | 0.8 | 0.8 | 0.8 | 0.8 | 0.8 | 0.8 |
| Durability | 220 | 180 | 120 | 110 | 110 | 120 |
| Productivity | 80 | 100 | 100 | 100 | 100 | 100 |

TABLE 5

| | Evaluation result | | | |
|---|---|---|---|---|
| | Ex. 14 | Ex. 15 | Ex. 16 | Ex. 17 |
| α [°] | 100 | 100 | 100 | 100 |
| βp [°] | 40 | 40 | 40 | 40 |
| βt [°] | 40 | 40 | 40 | 40 |
| Dp [mm] | 0.9 | 0.9 | 0.9 | 0.9 |
| Dt [mm] | 0.9 | 0.9 | 0.9 | 0.9 |
| Fp [N] | 34 | 34 | 34 | 34 |
| Ft [N] | 34 | 34 | 34 | 34 |
| t [mm] | 0.4 | 0.7 | 1.2 | 2.5 |
| Durability | 110 | 120 | 180 | 220 |
| Productivity | 100 | 100 | 100 | 80 |

As indicated in Tables 1 to 5, the tires of the examples are highly rated, compared to the tires of the comparative examples. The evaluation result clearly indicates that the present invention is superior.

The technology relating to the core described above is applicable to various tires.

The foregoing description is in all aspects illustrative, and various modifications can be devised without departing from the essential features of the invention.

What is claimed is:

1. A pneumatic tire comprising:
   a tread;
   a pair of sidewalls;
   a pair of beads; and
   a carcass, wherein
   the sidewalls extend almost inward from ends, respectively, of the tread in a radial direction,
   the beads are disposed inward of the sidewalls, respectively, in the radial direction,
   the carcass is extended on and between one of the beads and the other of the beads along inner sides of the tread and the sidewalls,
   the carcass includes a carcass ply,
   the carcass ply includes a carcass cord,
   each bead includes a core extending in a circumferential direction,
   the core includes a body having a hexagonal cross-section, and a cover covering the body,
   the cover is wrapped around the body, the number of turns the cover is wrapped around the body being greater than or equal to one and smaller than two,
   the cover includes a plain weave fabric obtained by interlacing warp threads and weft threads,
   the warp threads and the weft threads intersect, and an angle of the intersection is greater than or equal to 45° and not greater than 125°, and
   the warp threads are inclined relative to the carcass cord, and an angle of the inclination is greater than or equal to 22.5° and not greater than 67.5°.

2. The pneumatic tire according to claim 1, wherein
   in the plain weave fabric, a large number of the warp threads are spaced at intervals and a large number of the weft threads are spaced at intervals,
   each interval of the warp threads is greater than or equal to 0.5 mm and not greater than 2.0 mm, and
   each interval of the weft threads is greater than or equal to 0.5 mm and not greater than 2.0 mm.

3. The pneumatic tire according to claim 1, wherein
   the warp threads each have a strength of greater than or equal to 20 N, and
   the weft threads each have a strength of greater than or equal to 20 N.

4. The pneumatic tire according to claim 1, wherein
   the cover has a thickness of greater than or equal to 0.6 mm and not greater than 1.2 mm.

5. The pneumatic tire according to claim 1, wherein
   in the core, one end portion of the cover and another end portion of the cover overlap, and the overlap has a length of greater than or equal to 3 mm and not greater than 15 mm.

6. The pneumatic tire according to claim 1, wherein
   the warp threads each have a fineness of greater than or equal to 300 dtex and not greater than 1670 dtex, and
   the weft threads each have a fineness of greater than or equal to 300 dtex and not greater than 1670 dtex.

7. The pneumatic tire according to claim 1, further comprising a belt disposed inward of the tread in the radial direction, wherein
   the belt has an axial width which is greater than or equal to 0.7 times a cross-sectional width of the tire.

* * * * *